United States Patent
Unland

[19]

[11] Patent Number: 6,138,321

[45] Date of Patent: Oct. 31, 2000

[54] SNOW REMOVING SYSTEM FOR VEHICLES

[76] Inventor: Ronald M. Unland, 24954 S. Tryon St., Channahon, Ill. 60410

[21] Appl. No.: 09/204,493

[22] Filed: Dec. 3, 1998

[51] Int. Cl.[7] .................................. A47L 5/14; A47L 5/38
[52] U.S. Cl. ........................ 15/316.1; 15/312.1; 15/319; 34/666
[58] Field of Search ................. 15/312.1, 316.1, 15/319; 34/666

[56] References Cited

U.S. PATENT DOCUMENTS

| | | | |
|---|---|---|---|
| 2,788,009 | 4/1957 | Lones | 15/312.1 |
| 3,583,686 | 6/1971 | Mackey | 34/666 |
| 4,622,714 | 11/1986 | Tomasello | 15/316.1 |
| 4,836,467 | 6/1989 | Rodgers | 15/316.1 |
| 5,397,606 | 3/1995 | Jeffs | 34/666 |
| 5,596,818 | 1/1997 | Jones | 15/316.1 |
| 5,875,565 | 3/1999 | Bowman | 34/666 |
| 5,950,324 | 9/1999 | McElroy et al. | 15/316.1 |

*Primary Examiner*—Robert J. Warden, Sr.
*Assistant Examiner*—Theresa T. Snider

[57] ABSTRACT

A snow removing system for vehicles for clearing snow from vehicles prior to entering a road. The system includes a compressor. The compressor has a cool air line that extends from it. An inverted U-shaped gateway comprises a pair of vertical side posts and an upper horizontal member. The gateway is dimensioned for receiving vehicular traffic therein. A plurality of angled vents are disposed on the horizontal member of the gateway. The angled vents are in communication with the cool air line from the compressor for directing air onto a vehicle passing under the gateway.

9 Claims, 3 Drawing Sheets

6,138,321

SNOW REMOVING SYSTEM FOR VEHICLES

BACKGROUND OF THE INVENTION

1. Field of the Invention

The present invention relates to car cleaning devices and more particularly pertains to a new snow removing system for vehicles for clearing snow from vehicles prior to entering a road.

2. Description of the Prior Art

The use of car cleaning devices is known in the prior art. More specifically, car cleaning devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art car cleaning devices include U.S. Pat. No. 4,946,513 to Del Prato et al.; U.S. Pat. No. 4,852,199 to Holbus; U.S. Pat. No. Des. 344,345 to Goldberg; U.S. Pat. No. 5,148,570 to Crotts et al.; U.S. Pat. No. 4,937,908 to McCadden; and U.S. Pat. No. 4,744,122 to Beer et al.

While these devices fulfill their respective, particular objectives and requirements, the aforementioned patents do not disclose a new snow removing system for vehicles. The inventive device includes a compressor. The compressor has a cool air line that extends from it. An inverted U-shaped gateway comprises a pair of vertical side posts and an upper horizontal member. The gateway is dimensioned for receiving vehicular traffic therein. A plurality of angled vents are disposed on the horizontal member of the gateway. The angled vents are in communication with the cool air line from the compressor for directing air onto a vehicle passing under the gateway.

In these respects, the snow removing system for vehicles according to the present invention substantially departs from the conventional concepts and designs of the prior art, and in so doing provides an apparatus primarily developed for the purpose of clearing snow from vehicles prior to entering a road.

SUMMARY OF THE INVENTION

In view of the foregoing disadvantages inherent in the known types of car cleaning devices now present in the prior art, the present invention provides a new snow removing system for vehicles construction wherein the same can be utilized for clearing snow from vehicles prior to entering a road.

The general purpose of the present invention, which will be described subsequently in greater detail, is to provide a new snow removing system for vehicles apparatus and method which has many of the advantages of the car cleaning devices mentioned heretofore and many novel features that result in a new snow removing system for vehicles which is not anticipated, rendered obvious, suggested, or even implied by any of the prior art car cleaning devices, either alone or in any combination thereof.

To attain this, the present invention generally comprises a compressor. The compressor has a cool air line that extends from it. An inverted U-shaped gateway comprises a pair of vertical side posts and an upper horizontal member. The gateway is dimensioned for receiving vehicular traffic therein. A plurality of angled vents are disposed on the horizontal member of the gateway. The angled vents are in communication with the cool air line from the compressor for directing air onto a vehicle passing under the gateway.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snow removing system for vehicles apparatus and method which has many of the advantages of the car cleaning devices mentioned heretofore and many novel features that result in a new snow removing system for vehicles which is not anticipated, rendered obvious, suggested, or even implied by any of the prior art car cleaning devices, either alone or in any combination thereof.

It is another object of the present invention to provide a new snow removing system for vehicles which may be easily and efficiently manufactured and marketed.

It is a further object of the present invention to provide a new snow removing system for vehicles which is of a durable and reliable construction.

An even further object of the present invention is to provide a new snow removing system for vehicles which is susceptible of a low cost of manufacture with regard to both materials and labor, and which accordingly is then susceptible of low prices of sale to the consuming public, thereby making such snow removing system for vehicles economically available to the buying public.

Still yet another object of the present invention is to provide a new snow removing system for vehicles which provides in the apparatuses and methods of the prior art some of the advantages thereof, while simultaneously overcoming some of the disadvantages normally associated therewith.

Still another object of the present invention is to provide a new snow removing system for vehicles for clearing snow from vehicles prior to entering a road.

Yet another object of the present invention is to provide a new snow removing system for vehicles which includes a compressor. The compressor has a cool air line that extends from it. An inverted U-shaped gateway comprises a pair of vertical side posts and an upper horizontal member. The gateway is dimensioned for receiving vehicular traffic therein. A plurality of angled vents are disposed on the horizontal member of the gateway. The angled vents are in communication with the cool air line from the compressor for directing air onto a vehicle passing under the gateway.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
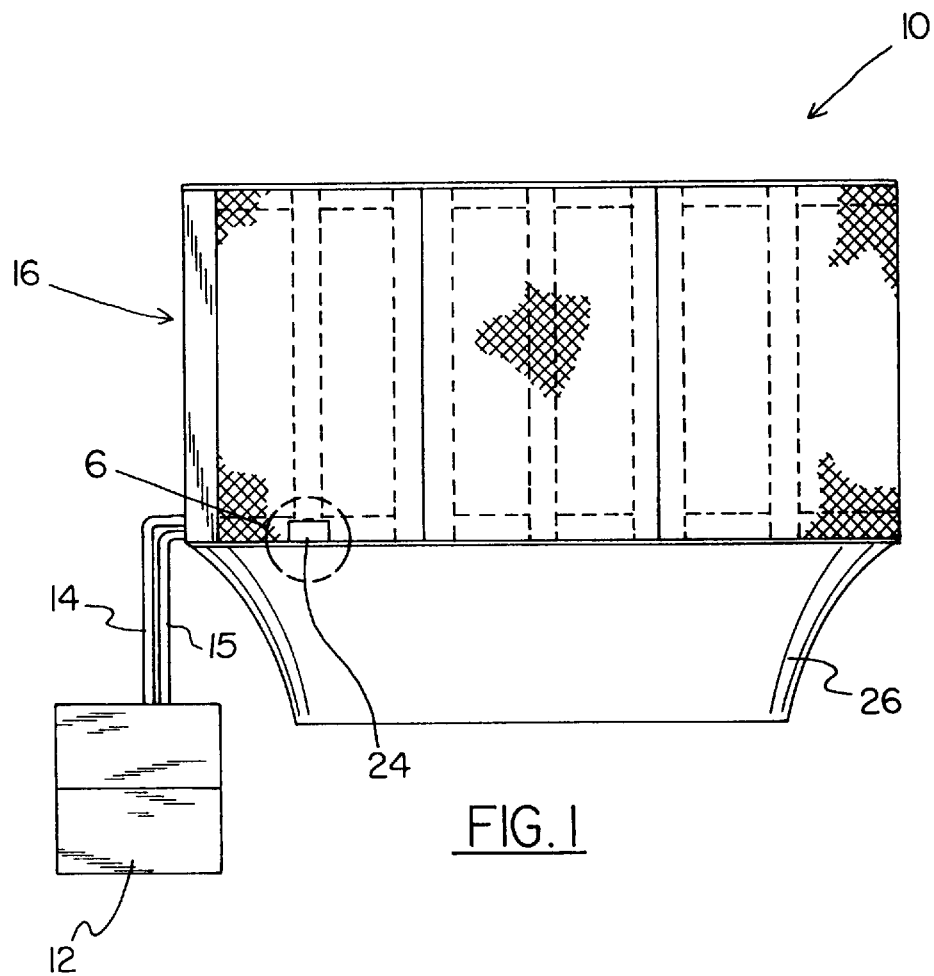
FIG. 1 is a plan view of a new snow removing system for vehicles according to the present invention.
Figure 2:
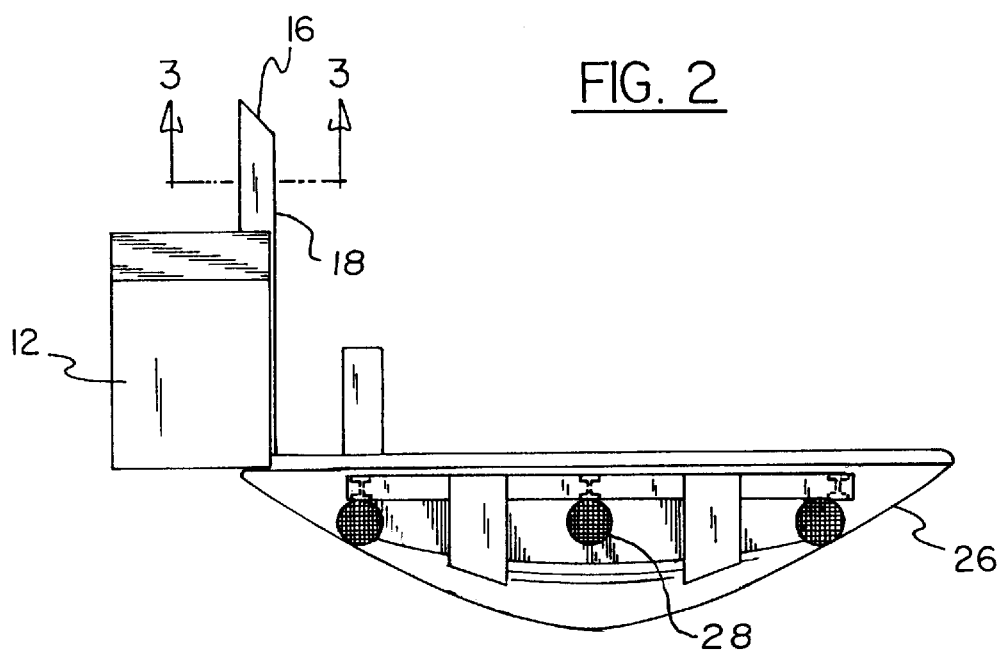
FIG. 2 is a side view of the present invention.
Figure 3:
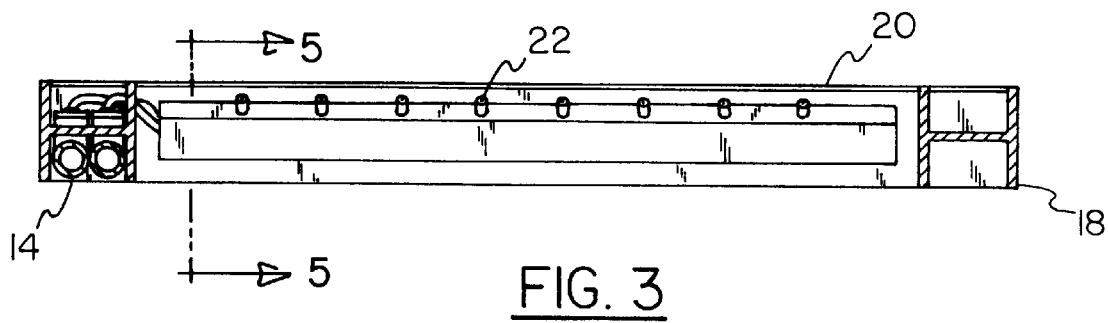
FIG. 3 is a cross-sectional view of the present invention as taken along line 3—3 of FIG. 2.
Figure 4:
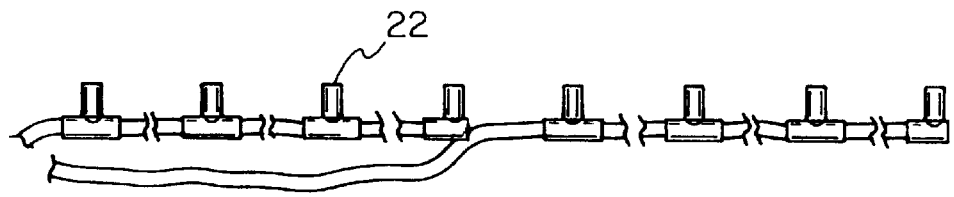
FIG. 4 is a side view of the air nozzles of the present invention.
Figure 5:
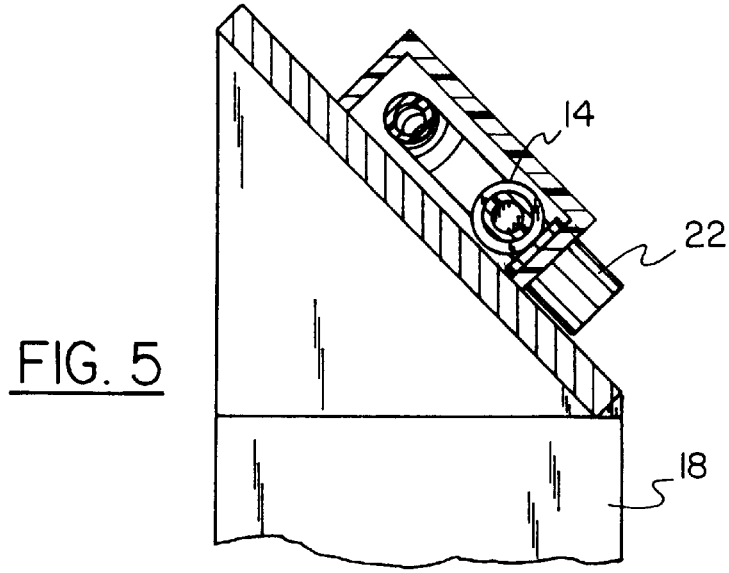
FIG. 5 is a cross-sectional view of the present invention as taken along line 5—5 of FIG. 3.
Figure 6:
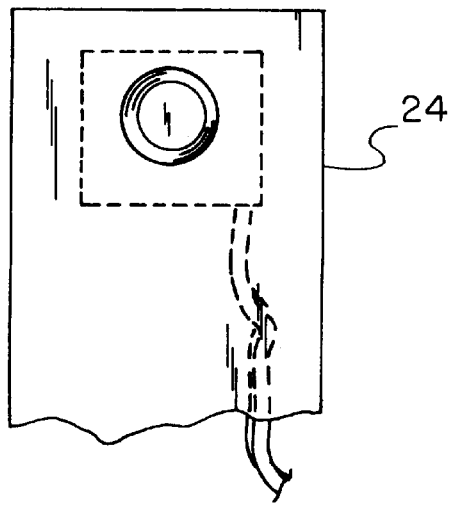
FIG. 6 is a side view of the control panel of the present invention as taken from circle 6 of FIG. 1.

With reference now to the drawings, and in particular to FIGS. 1 through 8 thereof, a new snow removing system for vehicles embodying the principles and concepts of the present invention and generally designated by the reference numeral 10 will be described.

As best illustrated in FIGS. 1 through 8, the snow removing system for vehicles 10 comprises a compressor (not illustrated). The compressor has a cool air line 14 that extends from it. An inverted U-shaped gateway 16 comprises a pair of vertical side posts 18 and an upper horizontal member 20. The gateway 16 is dimensioned for receiving vehicular traffic therein. A plurality of angled vents 22 are disposed on the horizontal member 20 of the gateway 16. The angled vents 22 are in communication with the cool air line 14 from the compressor for directing air onto a vehicle passing under the gateway, thereby blowing snow off of the vehicle.

Preferably, a furnace (not illustrated) is provided to melt the snow blown off of the vehicles. The furnace has a warm air line 15 that extends from it. The compressor and furnace are housed in a housing 12. Both lines 14,15 extend out of the housing 12. Ideally, the compressor and furnace are in communication with electric and gas sources via underground pipes to prevent the potential dangers created by exposed pipes and power cables near a roadway in winter.

Figure 7:
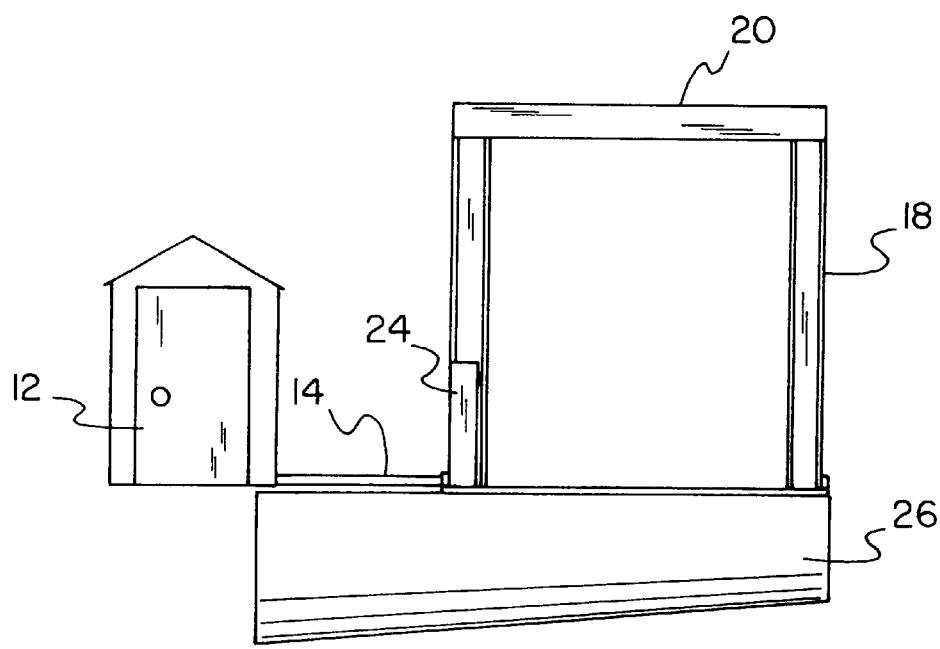
FIG. 7 is a side view of an alternate embodiment of the present invention.
Figure 8:
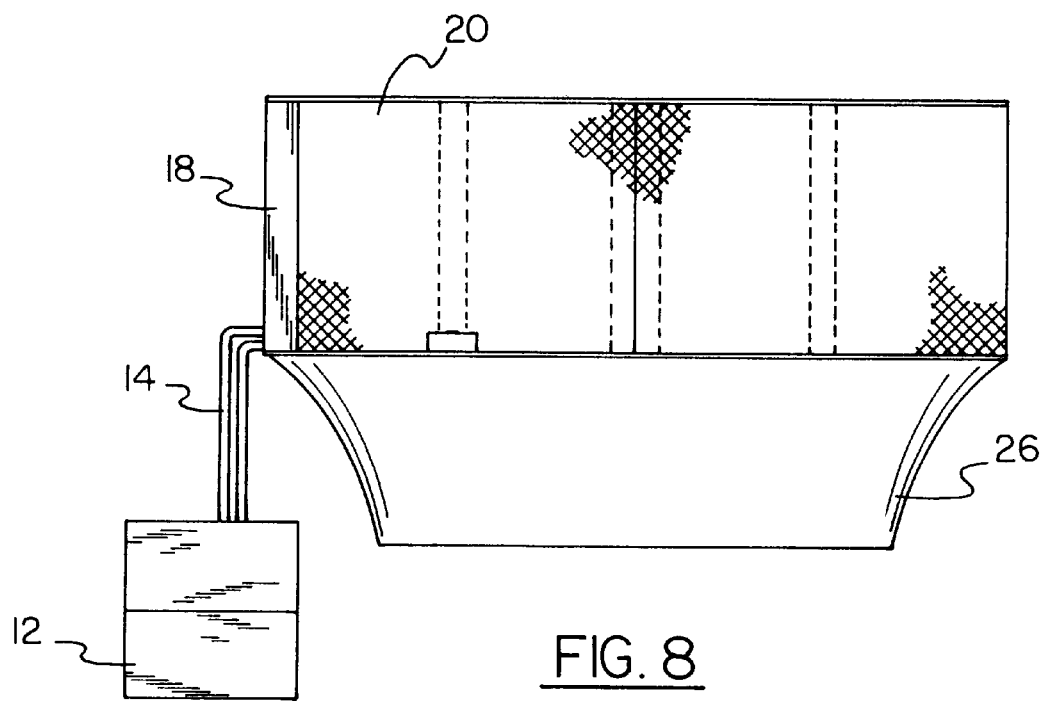
FIG. 8 is a plan view of the alternate embodiment of the present invention.

Also preferably, the gateway 16 is positioned adjacent to the housing 12. While the gateway 16 is preferably dimensioned for receiving vehicular traffic therein, variations in the size of the gateway 16 can be constructed. FIGS. 7 and 8 illustrate a gateway 16 designed for passenger cars.

The plurality of angled vents 22 are disposed on the horizontal member 20 of the gateway 16. Optionally, angled vents 22 may be disposed on the vertical posts 18 of the gateway 16 in addition to or instead of the vents 22 disposed on the horizontal member 20.

A control panel 24 is disposed within the gateway 16. The control panel 24 is in communication with the compressor and the furnace and selectively actuates the compressor and furnace.

Preferably, a ditch 26 is formed within a recipient surface adjacent to the gateway 16. The ditch 26 receives snow blown and melted off of a vehicle positioned within the gateway 16. Ideally, the ditch 26 has a warm air duct 28 that is in communication with the warm air line 15 from the furnace for melting the snow accumulated in the ditch 26.

Also preferably, an electronic eye (not shown) for sensing the approach of a vehicle is in communication with the compressor. The electronic eye automatically actuates the compressor when it detects an approaching car.

In use, the present invention is a system which would blow snow off of vehicles at roadside rest areas, truck stops, highway ramps, and the like. The main purpose of the system is to clear vehicles of snow before they get onto larger roads, to help prevent potential accidents which can occur when snow blows off vehicles while traffic is traveling at high speeds.

In the preferred embodiment, the present invention is based on a compressor unit which blows air through a series of vents 22. The compressor and furnace would be built into a tough, weather resistant housing 12, and could be fed by underground electric and gas lines. The air provided by this machinery would be fed through lines 14 into a concrete and steel gateway 16 designed similar to an enlarged croquet wicket. It would be large enough that all forms of highway vehicular traffic could pass under it, and could be positioned over an entry ramp to the highway or a lane leading from a rest area or truck stop back onto the highway. The angled vents 22 would be positioned in the concrete and steel gateway 16, and the forced air from the compressor would blow down from these vents 22. The air would blow away from the housing 12 toward a shallow ditch 26 along the opposite side. Warm air from the furnace would keep the ditch 26 clear by melting any snow accumulated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snow removing system for vehicles for clearing snow from vehicles prior to entering a road comprising, in combination:

a housing containing a compressor and furnace therein, the compressor and furnace being in communication with electric and gas sources via underground pipes, the compressor having a cool air line extending outwardly therefrom, the furnace having a warm air line extending outwardly therefrom;

an inverted U-shaped gateway positioned adjacent to the housing, the gateway comprising a pair of vertical side posts and an upper horizontal member, the gateway being dimensioned for receiving vehicular traffic therein;

a plurality of angled vents disposed within the gateway, the angled vents being in communication with the cool air line from the compressor for directing air onto a vehicle passing under the gateway for blowing snow off of the vehicle;

a control panel disposed within the gateway, the control panel being in communication with the compressor and the furnace, the control panel selectively actuating the compressor and furnace;

an electronic eye being in communication with the compressor and the furnace, the electronic eye sensing the approach of a vehicle and automatically actuating the compressor and furnace;

a ditch formed within a recipient surface adjacent to the gateway, the ditch receiving snow blown and melted off of a vehicle positioned within the gateway; and the ditch having a warm air duct being in communication with the warm air line from the furnace for melting the snow accumulated therein.

2. A snow removing system for vehicles for clearing snow from vehicles prior to entering a road comprising:

a compressor having a cool air line;

a gateway comprising a pair of substantially vertical side posts and a substantially horizontal upper member, the gateway being dimensioned for receiving vehicular traffic therein; and a plurality of angled vents disposed on the upper member of the gateway, the angled vents being in communication with the cool air line from the compressor for directing air onto a vehicle passing under the gateway;

a ditch formed in a surface located adjacent to the gateway, the ditch receiving snow blown and melted off of a vehicle positioned in the gateway;

a furnace having a warm air line; and a warm air duct being in communication with the warm air line of the furnace, the warm air duct being located adjacent the ditch for melting the snow accumulated in the ditch.

3. The snow removing system for vehicles as set forth in claim 2 and further including a housing for containing the compressor and a furnace in the housing for protecting the compressor and the furnace from the elements.

4. The snow removing system for vehicles as set forth in claim 2 and further including a control panel disposed within the gateway, the control panel being in communication with the compressor and the furnace, the control panel being for selective actuation of the compressor.

5. The snow removing system for vehicles as set forth in claim 2 and further including an electronic eye being in communication with the compressor, the electronic eye sensing the approach of a vehicle and automatically actuating the compressor.

6. A snow removing system for vehicles for clearing snow from vehicles prior to entering a road comprising:

a compressor being in communication with a power source, the compressor having a cool air line extending outwardly therefrom;

an inverted U-shaped gateway, the gateway comprising a pair of vertical side posts and an upper horizontal member, the gateway being dimensioned for receiving vehicular traffic therein; and a plurality of angled vents disposed on the horizontal member of the gateway, the angled vents being in communication with the cool air line from the compressor for directing air onto a vehicle passing under the gateway;

a ditch formed within a recipient surface adjacent to the gateway, the ditch receiving snow blown and melted off of a vehicle positioned within the gateway;

a furnace having a warm air line extending outwardly therefrom;

wherein the ditch has a warm air duct being in communication with the warm air line from the furnace for melting the snow accumulated therein.

7. The snow removing system for vehicles as set forth in claim 6 and further including an electronic eye being in communication with the compressor, the electronic eye sensing the approach of a vehicle and automatically actuating the compressor.

8. The snow removing system for vehicles as set forth in claim 6 and further including a housing for containing the compressor and the furnace in the housing for protecting the compressor and the furnace from the elements.

9. The snow removing system for vehicles as set forth in claim 6 and further including a control panel disposed within the gateway, the control panel being in communication with the compressor and the furnace, the control panel being for selective actuation of the compressor.

* * * * *